(12) United States Patent
Lin (10) Patent No.: US 9,744,663 B2
(45) Date of Patent: Aug. 29, 2017

(54) TOOL BOX (71) Applicant: Chao-Tang Lin, Taichung (TW)

(72) Inventor: Chao-Tang Lin, Taichung (TW)

( * ) Notice: Subject to any disclaimer, the term of this patent is extended or adjusted under 35 U.S.C. 154(b) by 33 days.

(21) Appl. No.: 14/986,650

(22) Filed: Jan. 1, 2016

(65) Prior Publication Data
US 2017/0190044 A1 Jul. 6, 2017

(51) Int. Cl.
B25H 3/02 (2006.01)
B62B 3/02 (2006.01)
B62B 3/16 (2006.01)
B62B 3/00 (2006.01)

(52) U.S. Cl.
CPC .............. *B25H 3/02* (2013.01); *B62B 3/002* (2013.01); *B62B 3/16* (2013.01)

(58) Field of Classification Search
CPC .......... B25H 3/02; B25H 3/021; B25H 3/023; B25H 3/025; B25H 3/026; B25H 3/027; B25H 3/028; B62B 3/002; B62B 3/003; B62B 3/004; B62B 3/005; B62B 3/16
USPC ....................................... 206/372
See application file for complete search history.

(56) References Cited

U.S. PATENT DOCUMENTS

| 6,637,592 | B1 * | 10/2003 | Lai | B25H 3/023 206/372 |
| 7,832,584 | B2 * | 11/2010 | Eggers | B25H 3/023 206/373 |
| 8,714,355 | B2 * | 5/2014 | Huang | B25H 3/028 190/120 |
| 9,145,045 | B2 * | 9/2015 | Chang | H01M 2/1077 |
| 9,193,061 | B1 * | 11/2015 | Lin | B65D 81/02 |
| 2002/0117944 | A1 * | 8/2002 | Chen | A47B 47/0075 312/249.11 |
| 2004/0188294 | A1 * | 9/2004 | Chen | B25H 3/028 206/349 |
| 2005/0062244 | A1 * | 3/2005 | Guirlinger | B25H 3/00 280/47.26 |
| 2006/0011624 | A1 * | 1/2006 | Shih | B25H 3/02 220/4.24 |
| 2007/0272572 | A1 * | 11/2007 | Chen | B25H 3/021 206/373 |
| 2011/0074262 | A1 * | 3/2011 | Liu | B25H 3/028 312/334.1 |
| 2012/0248131 | A1 * | 10/2012 | Wang | B25H 3/02 220/830 |
| 2013/0127183 | A1 * | 5/2013 | Chang | B25H 3/02 292/202 |

(Continued)

*Primary Examiner* — Joshua Rodden (57) ABSTRACT

A tool box includes two first bodies and each first body has two first connection portions on the first end thereof. Two connectors are respectively connected to the first connection portions and each connectors has a second pivotal portion and a third pivotal portion. The second pivotal portion is a tubular portion with a C-shaped cross section which includes an elongate opening defined axially therethrough. The width of the elongate opening is smaller than the inner diameter of the second pivotal portion. The third pivotal portion is a rod which shares a common axis with the second pivotal portion. The diameter of the third pivotal portion is equal to or smaller than the inner diameter of the second pivotal portion. The third pivotal portions on one of the two first bodies are pivotably connected to the second pivotal portions on the other one of the two first bodies to pivotably connect the two first bodies.

9 Claims, 14 Drawing Sheets

(56) References Cited

U.S. PATENT DOCUMENTS

2016/0144501 A1* 5/2016 Wang .................... B25H 3/023
                                                          206/372
2016/0290013 A1* 10/2016 Lin ........................ E05B 65/52
2016/0332651 A1* 11/2016 Benning ................ B62B 3/005
2017/0001655 A1* 1/2017 Huang ................... B62B 3/003

* cited by examiner

Figure 21:
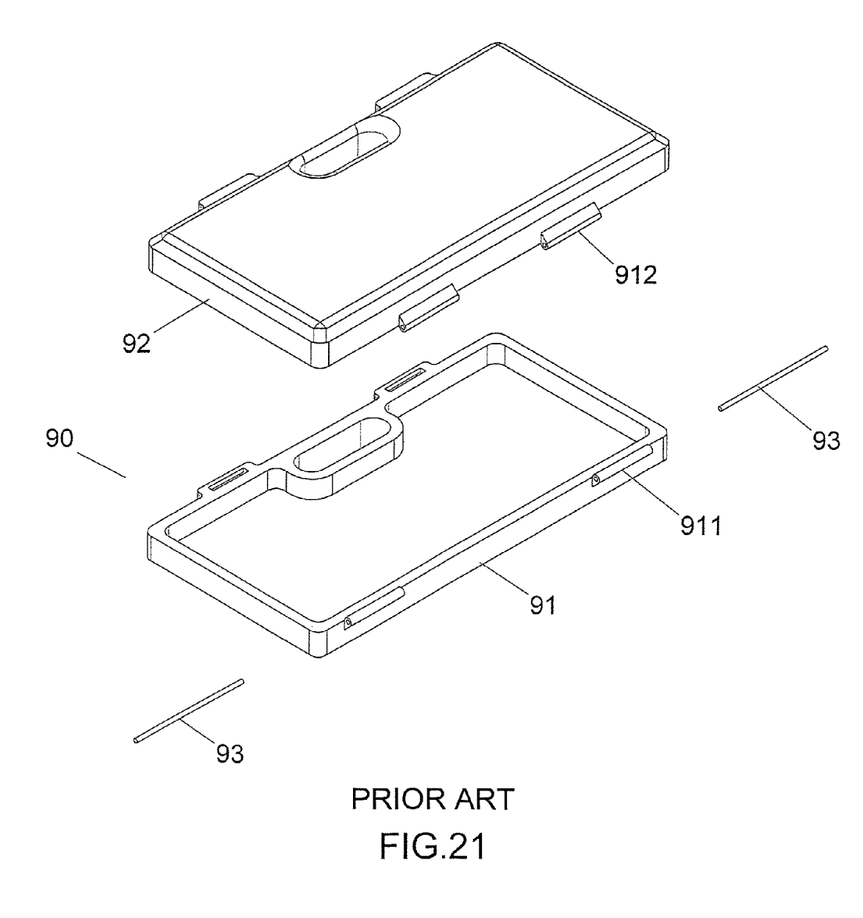
FIG. 21 is an exploded view of a conventional tool box.

PRIOR ART
FIG.21 though the first and second connection members 911, 912, so that once the pins 93 are installed to the first and second connection members 911, 912, they are difficult to be pulled out.

The present invention intends to provide a tool box to eliminate the shortcomings mentioned above.

SUMMARY OF THE INVENTION

The present invention relates to a tool box and comprises two first bodies and each first body has two first mounting portions on the first end thereof. Two connectors are respectively connected to the first mounting portions and each connectors has a second pivotal portion and a third pivotal portion. The second pivotal portion is a tubular portion with a C-shaped cross section which includes an elongate opening defined axially therethrough. The width of the elongate opening is smaller than the inner diameter of the second pivotal portion. The third pivotal portion is a rod which shares a common axis with the second pivotal portion. The diameter of the third pivotal portion is equal to or smaller than the inner diameter of the second pivotal portion. The third pivotal portions on one of the two first bodies are pivotably connected to the second pivotal portions on the other one of the two first bodies to pivotably connect the two first bodies.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the tool box of the present invention comprises two first bodies 10 and each first body 10 has a front end and a rear end. The two first bodies 10 are made by way of plastic injection molding or plastic injection blow molding, or made by metal. Each first body 10 has two first mounting portions 11 formed on the front end thereof, and each first body 10 has a first room 12 and a first snapping portion 14 formed on the rear end thereof. The first room 12 has a first pivotal portion 13 formed therein. The two first bodies 10 each have a first rail 15 on each of two sides thereof. Each first rail 15 has a first engaging portion 16 which is located close to the first connection portion 11.

Two connectors 20 are connected to the two first mounting portions 11, and each connector 20 has a second pivotal portion 21 and a third pivotal portion 22 on the front side thereof. The two connectors 20 each have a through hole 23 defined therethrough. The second pivotal portion 21 is a tubular portion with a C-shaped cross section and has an elongate opening 211 defined axially therethrough. The width of the elongate opening 211 is smaller than the inner diameter of the second pivotal portion 21. The third pivotal portion 22 is a rod with two side legs, and the third pivotal portion 22 having a medial section 220 which shares a common axis with the second pivotal portion 21. The diameter of the mediate section 220 is equal to or smaller than the inner diameter of the second pivotal portion 21. The through hole 23 extends parallel to the mediate section 220. Each connector 20 has a second connection portion 24 formed on the rear side thereof. The second mounting portion 24 has a top jaw 241 and a bottom jaw 242, and a distance is formed between the top and bottom jaws 241, 242. The top and bottom jaws 241, 242 are respectively engaged with the top and the bottom of the first connection portion 11 corresponding thereto.

As shown in FIGS. 6 to 12, the third pivotal portions 22 of the connectors 20 of one of the two first bodies 10 extend through the elongate openings 211 of the connectors 20 of the other one of the two first bodies 10 and are pivotably connected to the second pivotal portions 21 so as to connect the two first bodies 10 by the two connectors 20.

A connection member 30 is located within the first room 12 and pivotably connected to the first pivotal portion 13. The connection member 30 has a fourth pivotal portion 31 and a second snapping portion 32 respectively formed on the top and the bottom thereof. The first pivotal portion 13 includes two circular holes, and the fourth pivotal portion 31 is a tubular portion, a first pin 33 extends through the fourth pivotal portion 31 and is connected between the two circular holes of the first pivotal portion 13. The fourth pivotal portion 31 is pivotably connected to the first pivotal portion 13, and the connection member 30 can be pivoted up and down relative to the first pivotal portion 13. The second snapping portion 32 of the connection member 30 of one of the two bodies 10 is connected to the first snapping portion 14 of the other one of the two bodies 10. The first bodies 10 receive tools therein.

Figure 1:
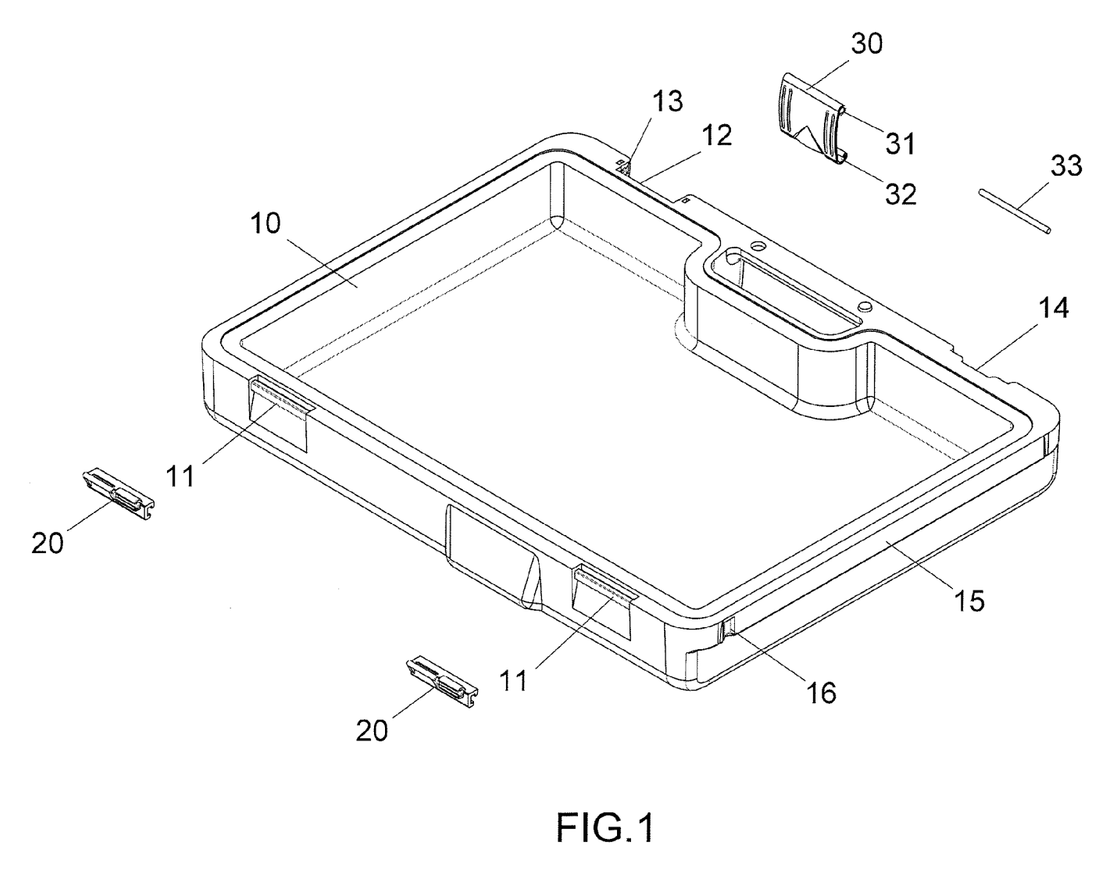
FIG. 1 is an exploded view of the first body of the tool box of the present invention.
Figure 2:
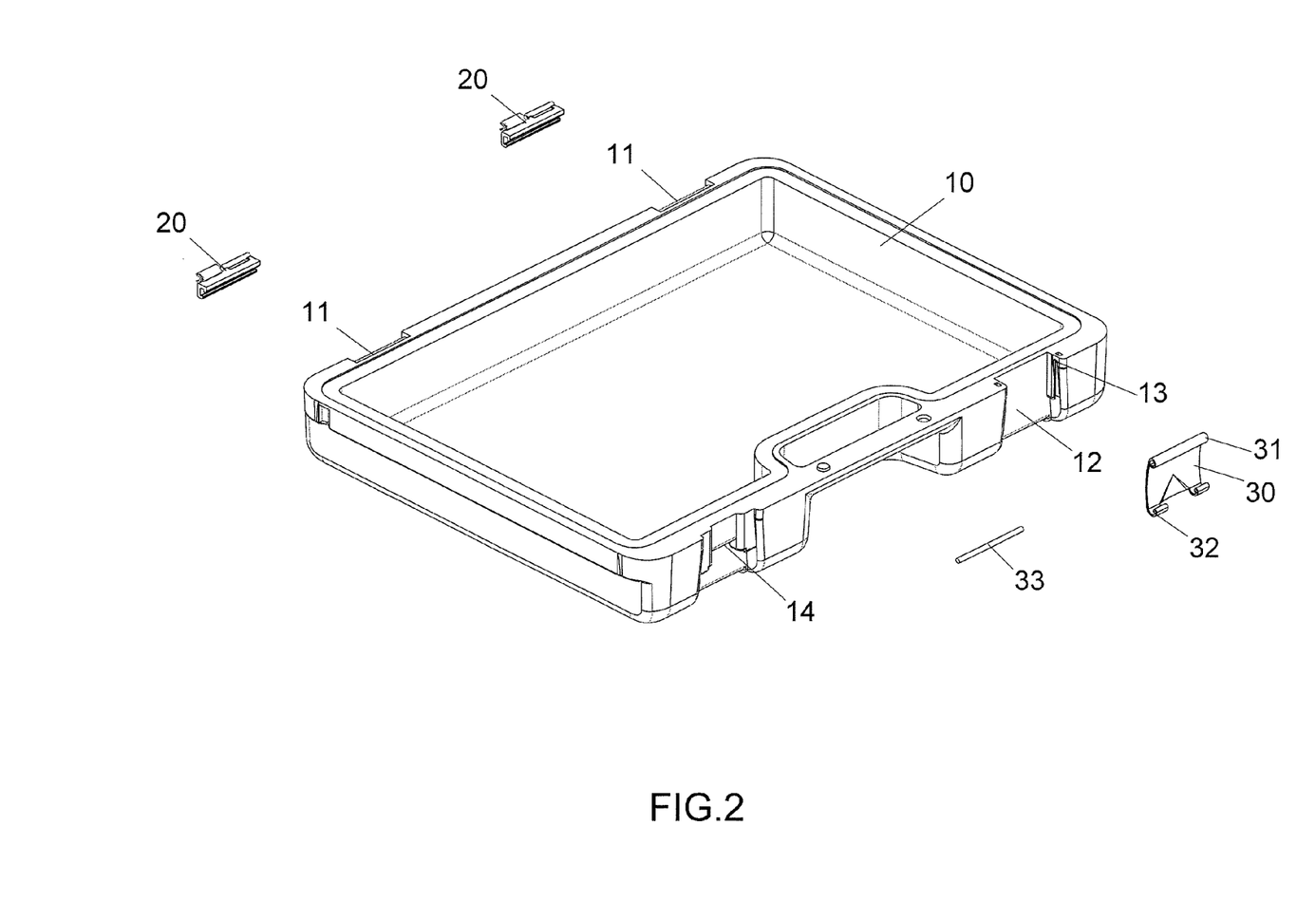
FIG. 2 is another exploded view of the first body of the tool box of the present invention.
Figures 3, 4:
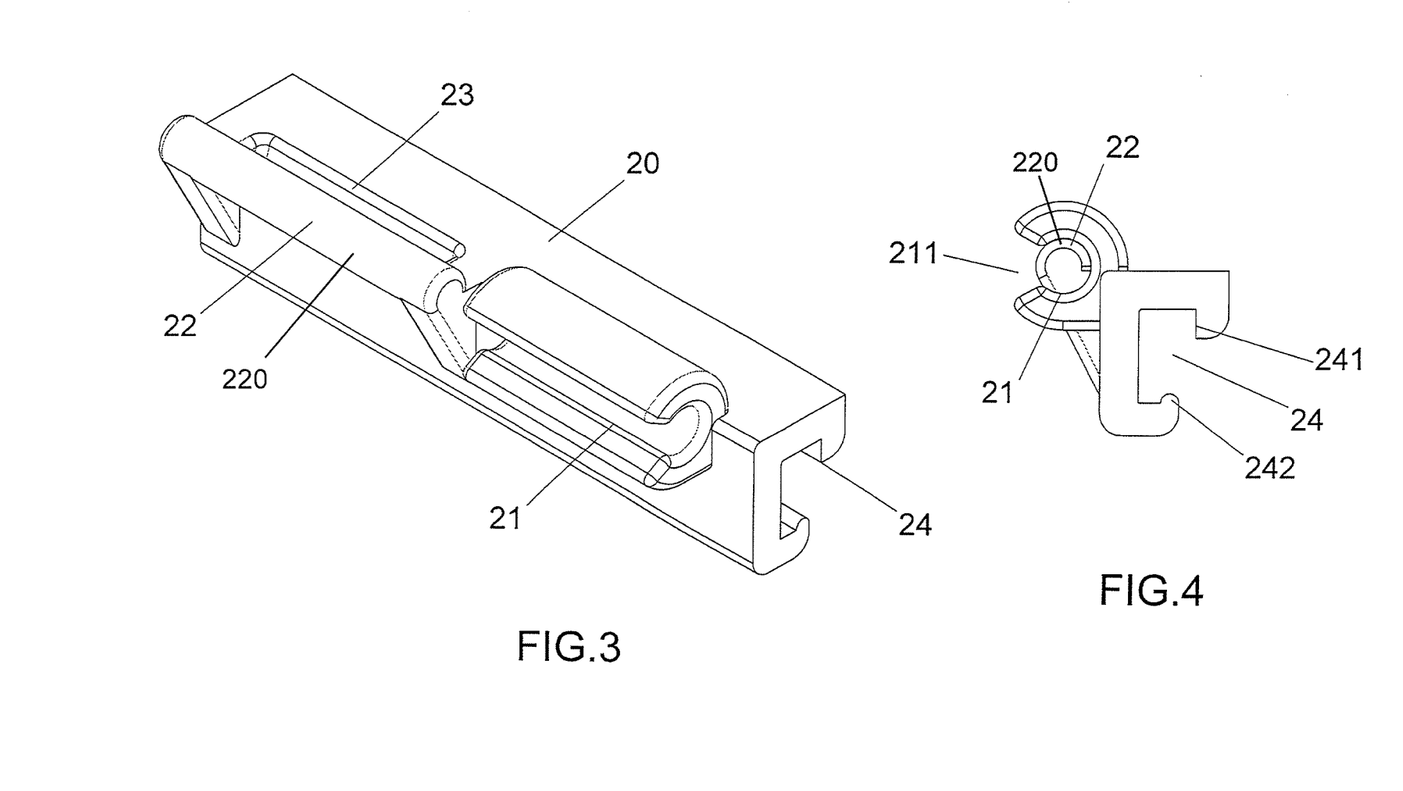
FIG. 3 is a perspective view to show the connector of the present invention.
FIG. 4 is a side view to show the connector of the present invention.
Figure 5:
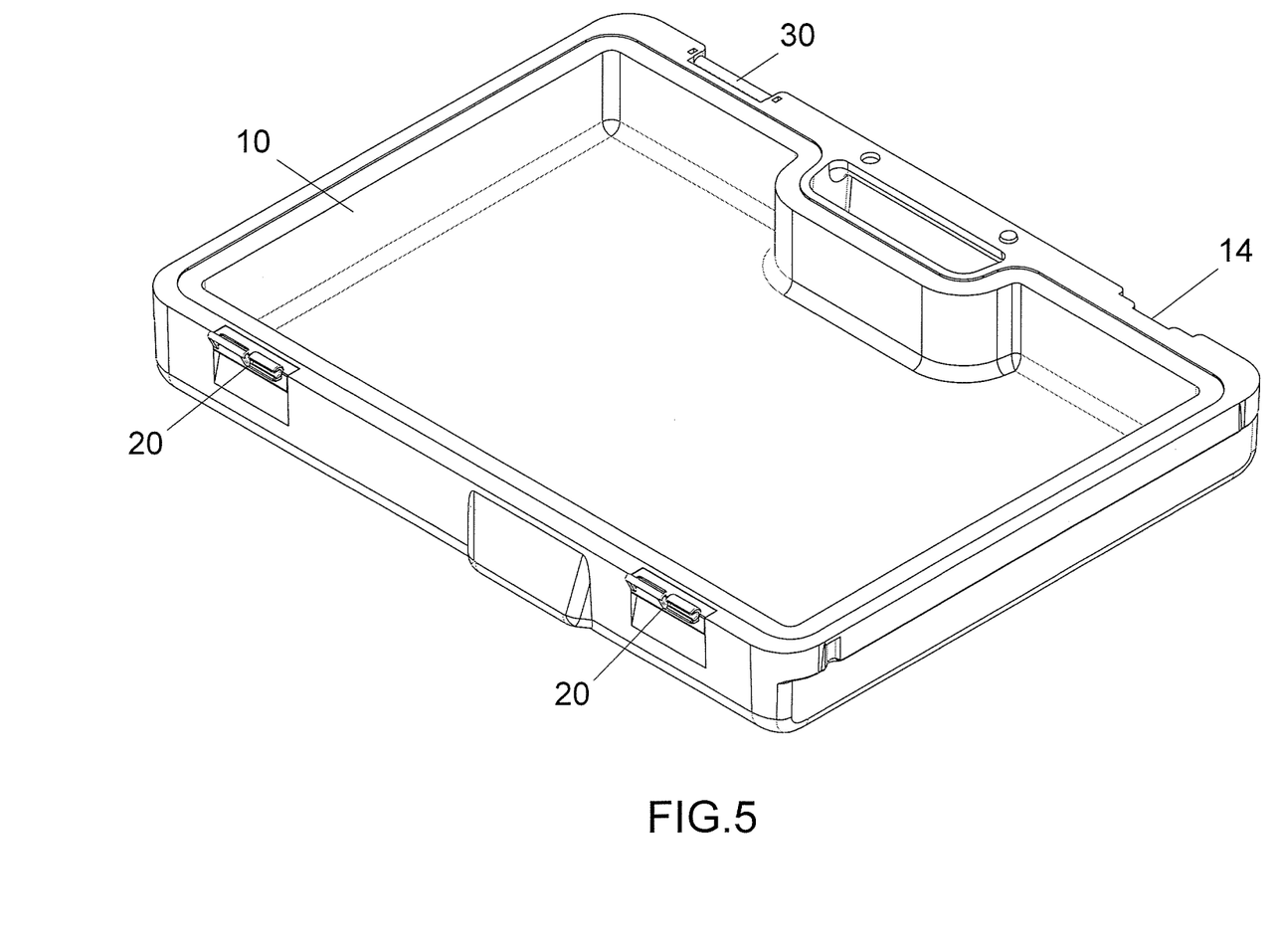
FIG. 5 shows the first body with the connectors and the connection member connected thereto.
Figure 6:
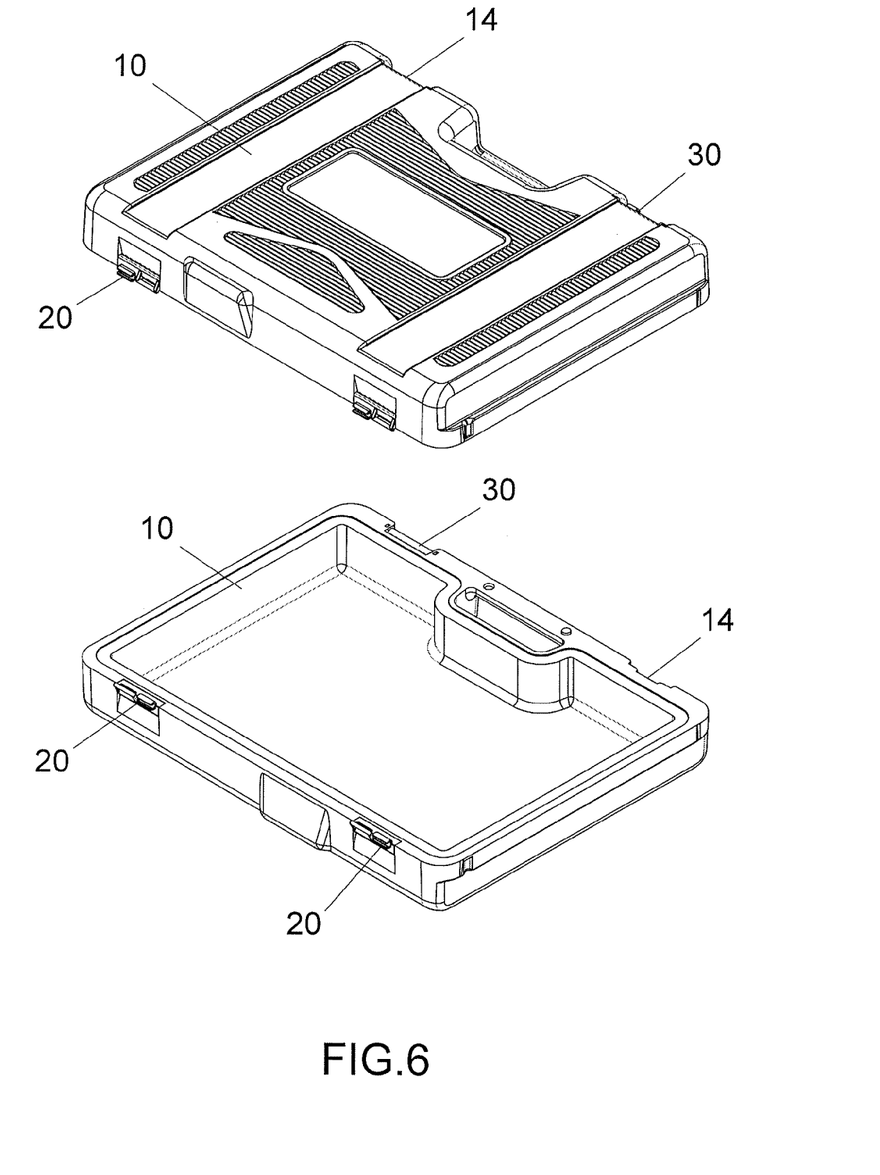
FIG. 6 is an exploded view of the two first bodies of the tool box of the present invention.
Figure 7:
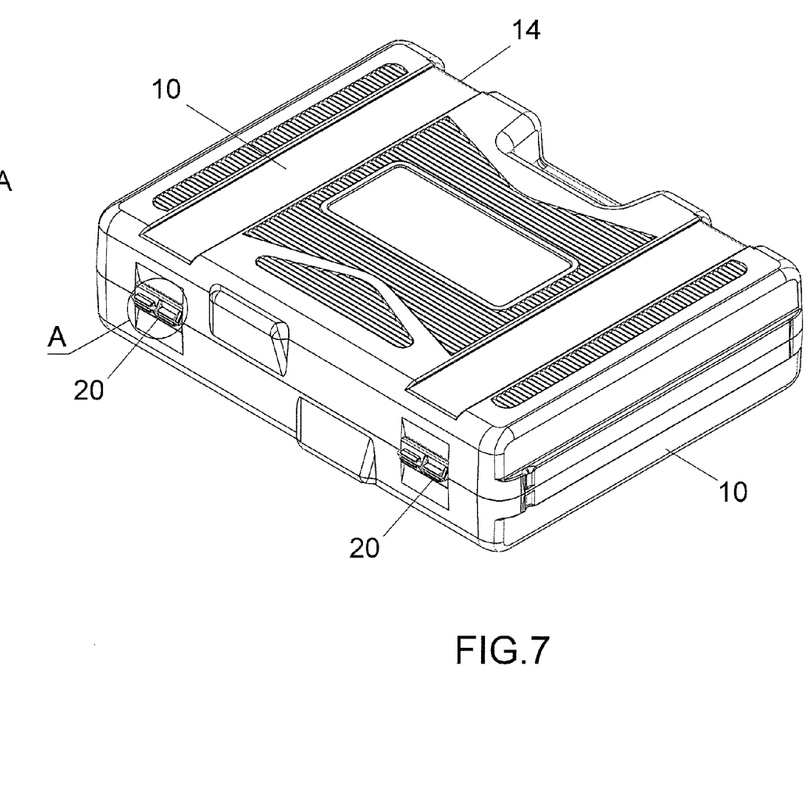
FIG. 7 is a perspective view to show the tool box of the present invention.
Figure 8:
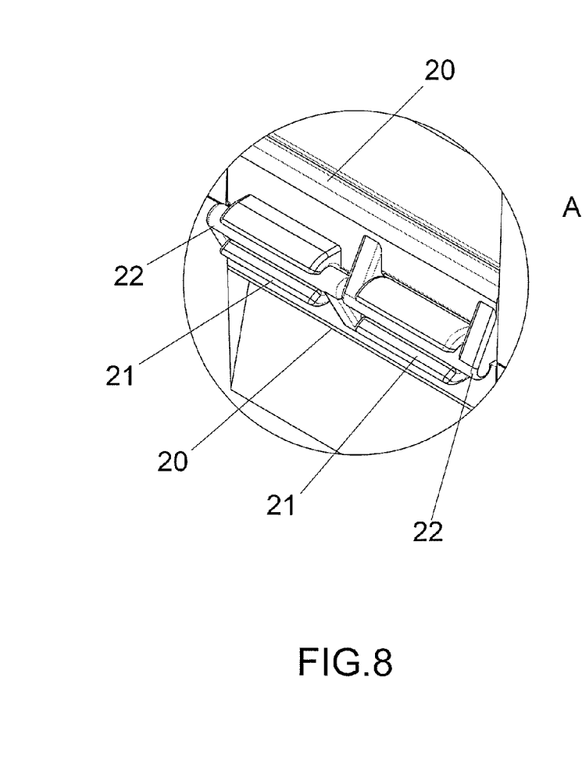
FIG. 8 is an enlarged view of the circled portion in FIG. 7.
Figure 9:
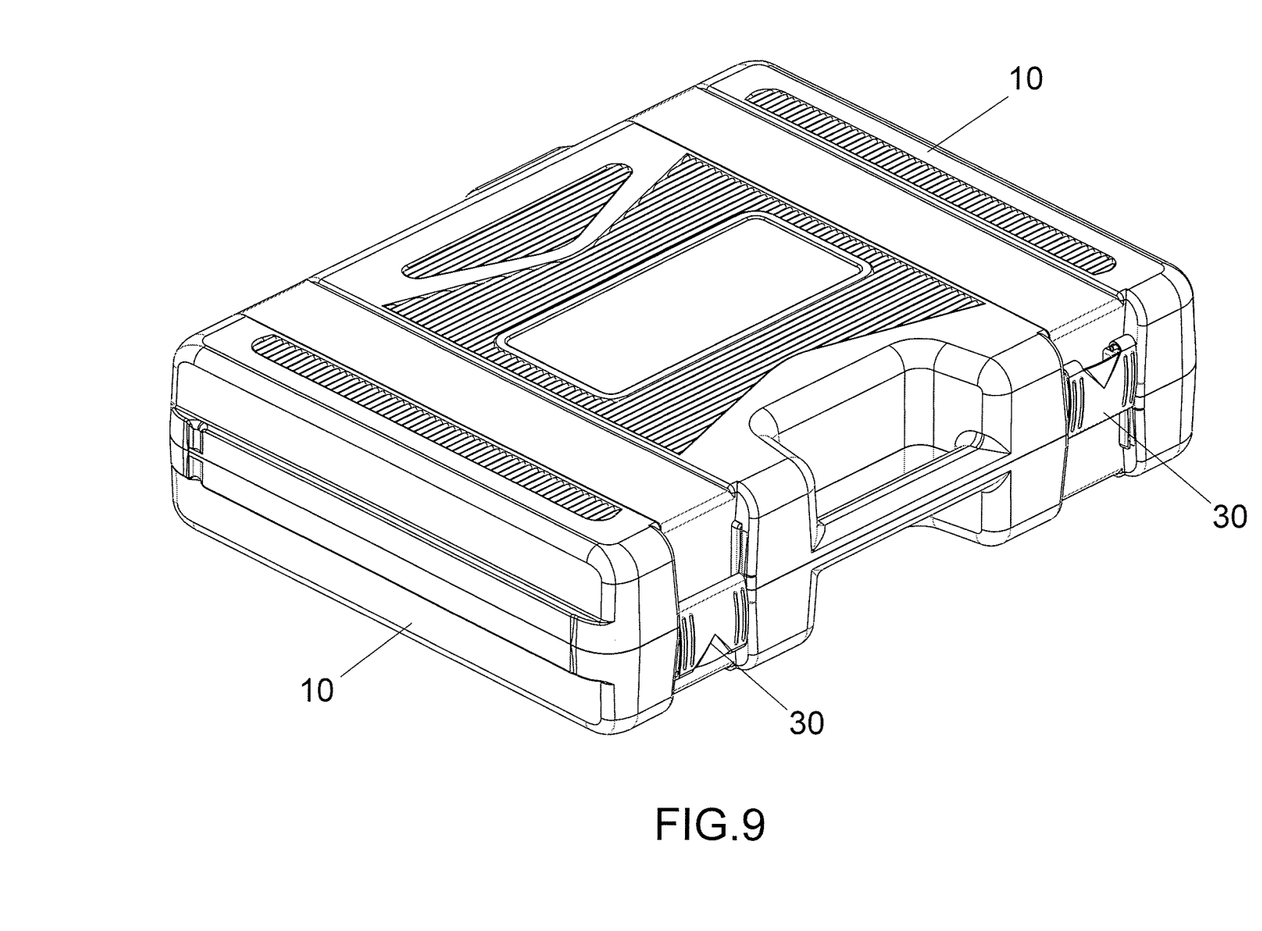
FIG. 9 is another perspective view to show the tool box of the present invention.
Figure 10:
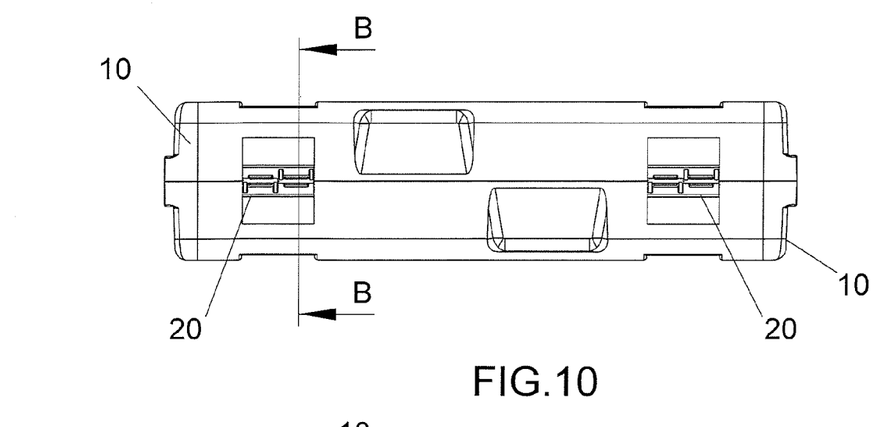
FIG. 10 is a front view of the tool box of the present invention.
Figure 11:
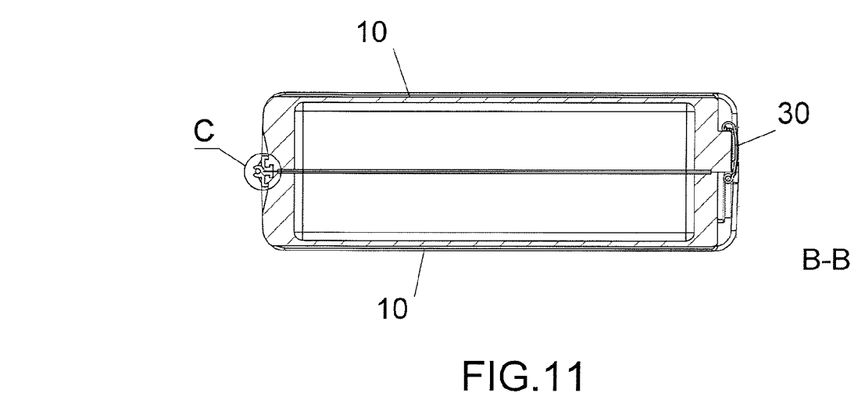
FIG. 11 is a cross sectional view, taken along line B-B in FIG. 10.
Figure 12:
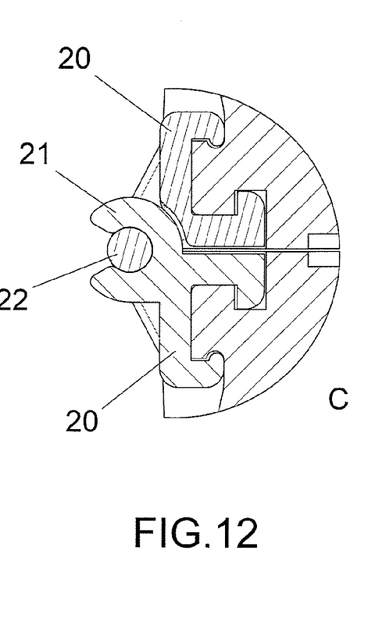
FIG. 12 is an enlarged view of the circled portion in FIG. 11.

As shown in FIG. 9, the first room 12 is located corresponding to the first snapping portions 14, the connection member 30 in the first room 12 of one of the two first bodies 10 is pivoted downward to be snapped with the first snapping portion 14 of the other first body 10 so as to close the two first bodies 10.

Figure 13:
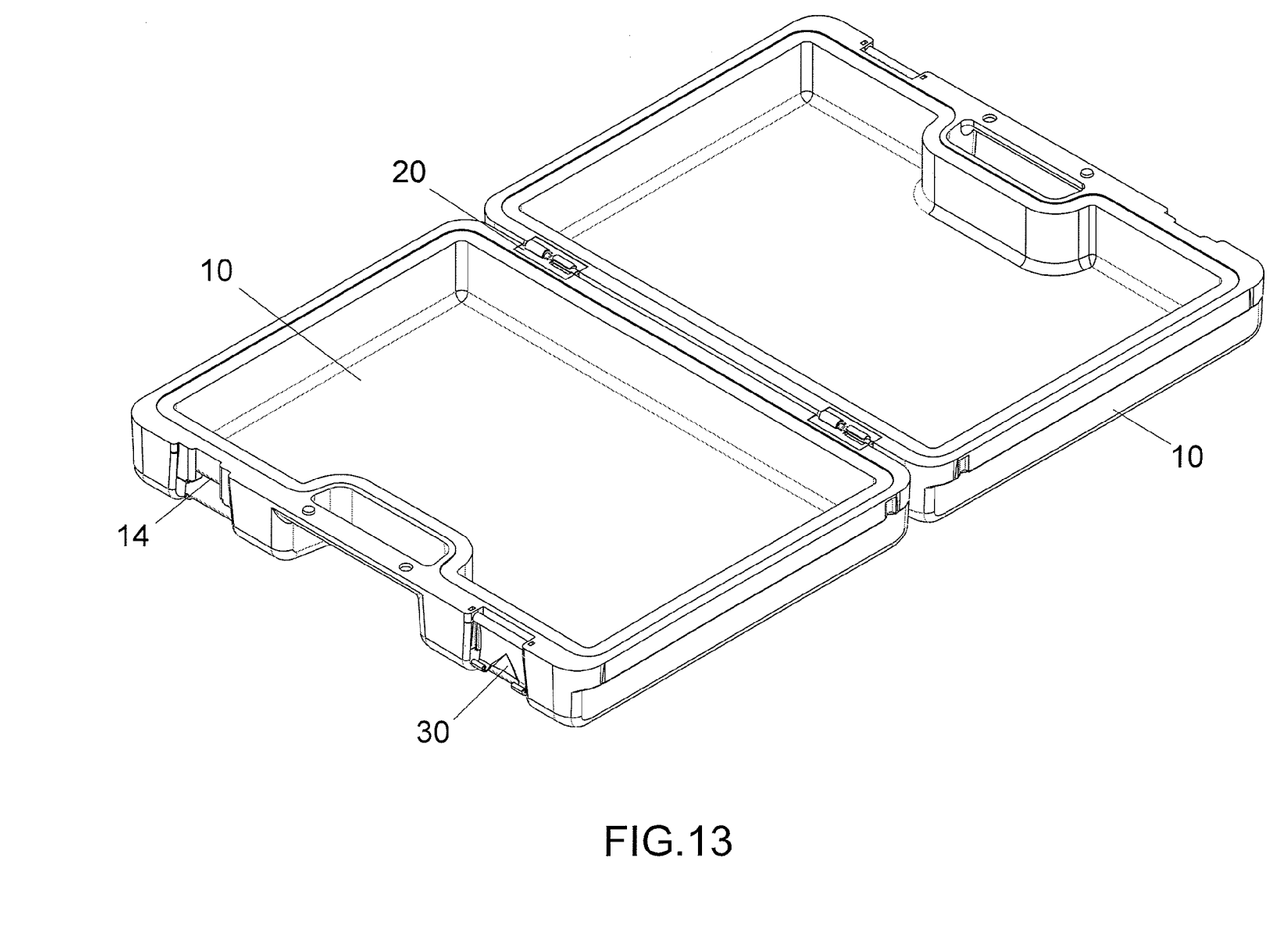
FIG. 13 shows that the tool box of the present invention is opened.

As shown in FIG. 13, when pivoting the connection members 30 to separate from the first snapping portions 14, the two first bodies 10 are able to be opened.

Figures 14, 15:
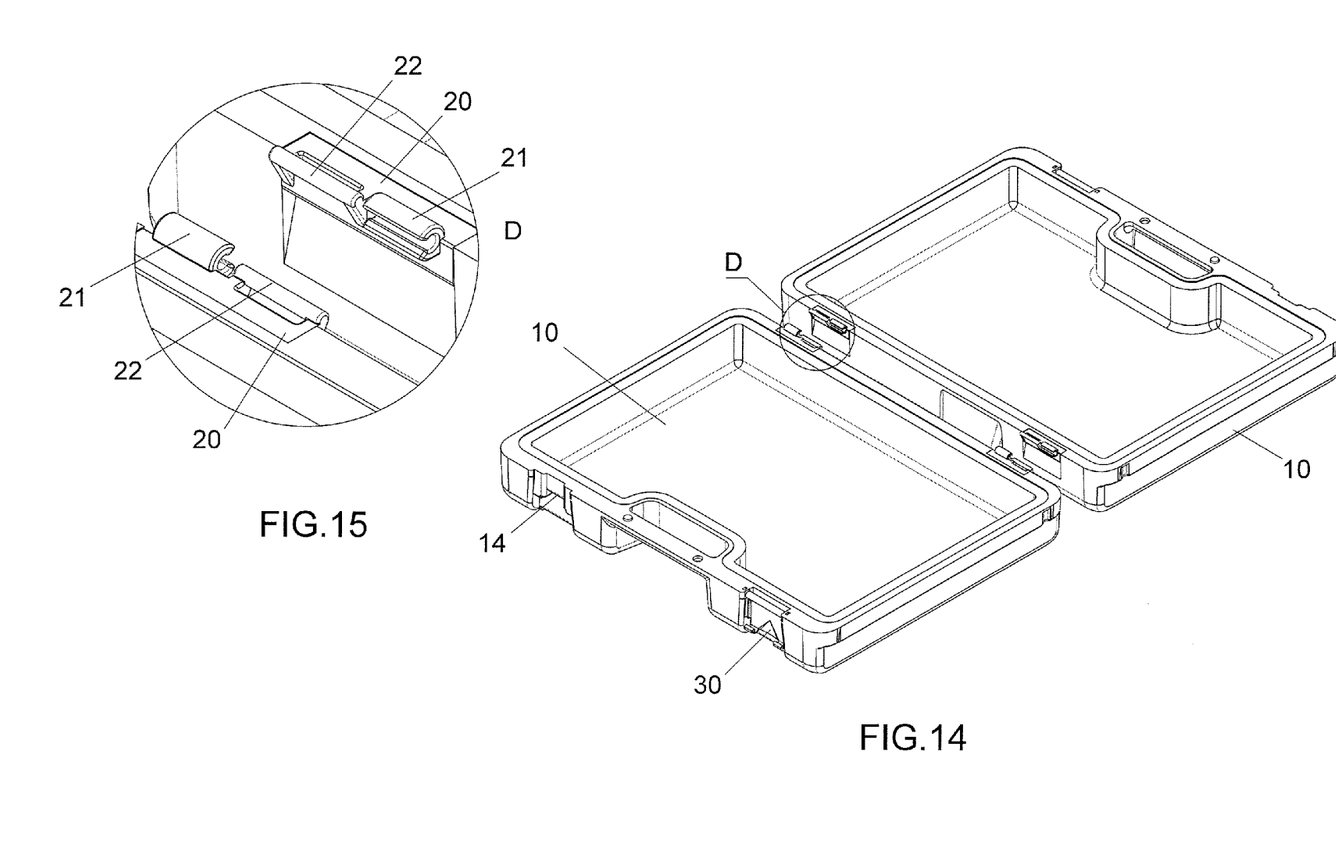
FIG. 14 shows the two separated first bodies of the tool box of the present invention.
FIG. 15 is an enlarged view of the circled portion in FIG. 15.

As shown in FIGS. 14 and 15, when the two first bodies 10 are opened, the user can apply a force to pass the third pivotal portions 22 through the elongate openings 211 so as to be separated from the second pivotal portions 21, such that the two first bodies 10 are separated from each other.

Figure 16:
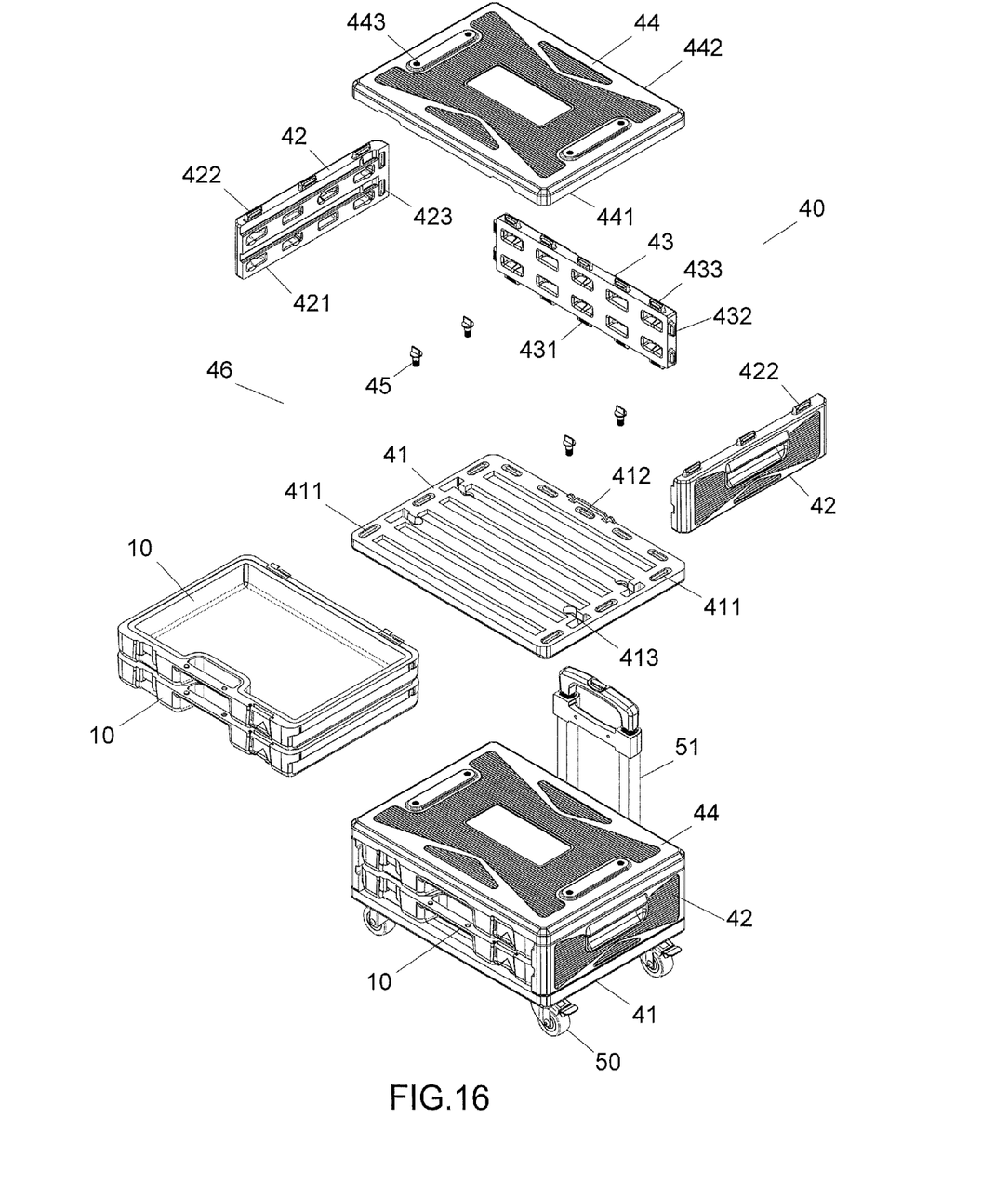
FIG. 16 is an exploded view of the second embodiment of the tool box of the present invention.
Figures 17, 18, 19:
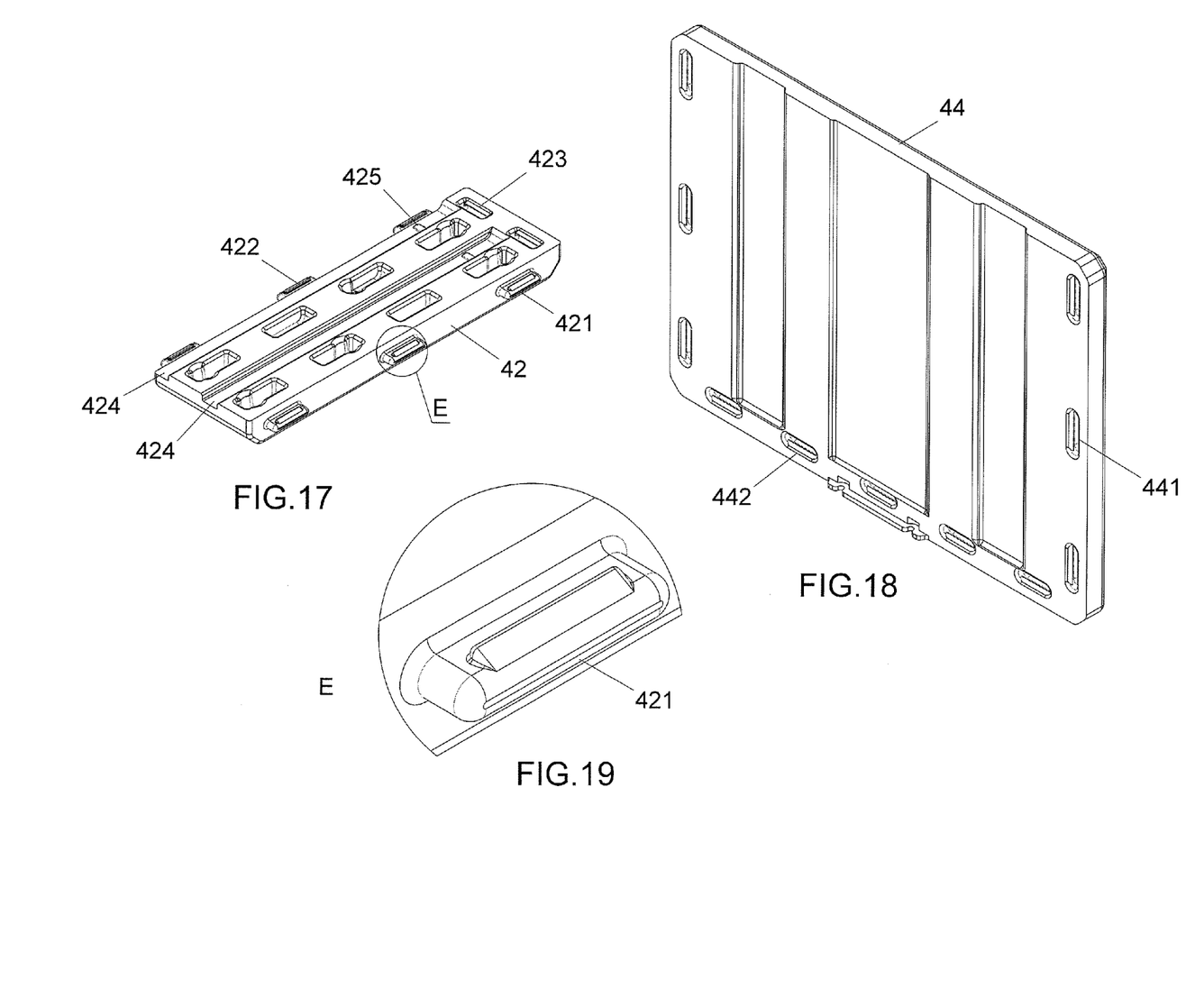
FIG. 17 shows the side board of the second embodiment of the tool box of the present invention.
FIG. 18 shows the cover of the second embodiment of the tool box of the present invention.
FIG. 19 is an enlarged view of the circled portion in FIG. 17.

As shown in FIGS. 14 to 16, the tool box can be assembled to be a cart, and comprises a second body 40 having a rectangular bottom board 41, two side boards 42, a rear board 43, a cover 44, multiple bolts 45 and a space 46. The bottom board 41 is located at the bottom of the second body 40 and has multiple first connection portions 411 formed on two inner sides thereof. Multiple second connection portions 412 are defined in the inner rear side of the bottom board 41 and located between the first connection portions 411 on the two inner sides of the bottom board 41. Two first connection holes 413 are defined through the bottom board 41 and located close to each of the two inner sides of the bottom board 41. The first connection holes 413 are circular holes. The two side boards 42 are located on two sides of the second body 40. The two side boards 42 are connected to the first connection portions 411, and each side board 42 has multiple third connection portions 421 formed on the outer side thereof as shown in FIGS. 17 to 19. The third connection portions 421 are rectangular blocks and connected to the first connection portions 411. When connecting the third connection portions 421 to the first connection portions 411, the third connection portions 421 each have a protrusion, the user has to apply a certain force to ensure that the third connection portions 421 are engaged within the first connection portions 411 and do not separate from each other.

Each side board 42 has multiple fourth connection portions 422 on the top end thereof, and each side board 42 has multiple fifth connection portions 423 formed on the inner rear side thereof. The fourth connection portions 422 are rectangular blocks and the fifth connection portions 423 are slots. The side boards 42 each have two second rails 424 which are located between the third and fourth connection portions 421, 422. The second rails 424 are slidably engaged with the first rail 15. Each second rail 424 has a second engaging portion 425 on one end thereof, the second engaging portion 425 is engaged within the first engaging portion 16. The engaging portion 425 is an oval protrusion.

The rear board 43 is connected to the rear side of the second body 40 and connected to the second connection portions 412. The rear board 43 has multiple sixth connection portions 431 formed on the bottom end thereof. The sixth connection portions 431 are connected to the second connection portions 412. The rear board 43 has two seventh connection portions 432 on each of two ends thereof, and the seventh connection portions 432 are connected to the fifth connection portions 423. The rear board 43 has multiple eighth connection portions 433 formed on the top end thereof. The cover 44 is connected to the two side boards 42 and the rear board 43. As shown in FIG. 18, the cover 44 has multiple ninth connection portions 441 formed on two inner sides thereof. The ninth connection portions 441 are connected to the fourth connection portions 422 of the two side boards 42. The cover 44 has multiple tenth connection portions 442 formed on the inner rear side thereof. The tenth connection portions 442 are connected to the eighth connection portions 433. Two second connection holes 443 are defined through the cover 44 and located close to each of two ends of the cover 44. The bolts 45 extend through the aligned second connection holes 443 and the first connection holes 413 to connect two second bodies 40. The space 46 is defined between the bottom board 41, the two side boards 42, the rear board 43, and the cover 44. The space 46 receives the two first bodies 10. In this embodiment, the first, second and fifth connection portions 411, 412, 423 are recesses. The third, fourth sixth, seventh and eighth connection portions 421, 422, 431, 432, 433 are elongate blocks.

The bottom board 41 has four wheels 50 connected to four corners thereof so that the second body 40 is moved with the wheels 50. The rear board 43 has a pull rod 51 connected thereto, the pull rod 51 is retractable.

Figure 20:
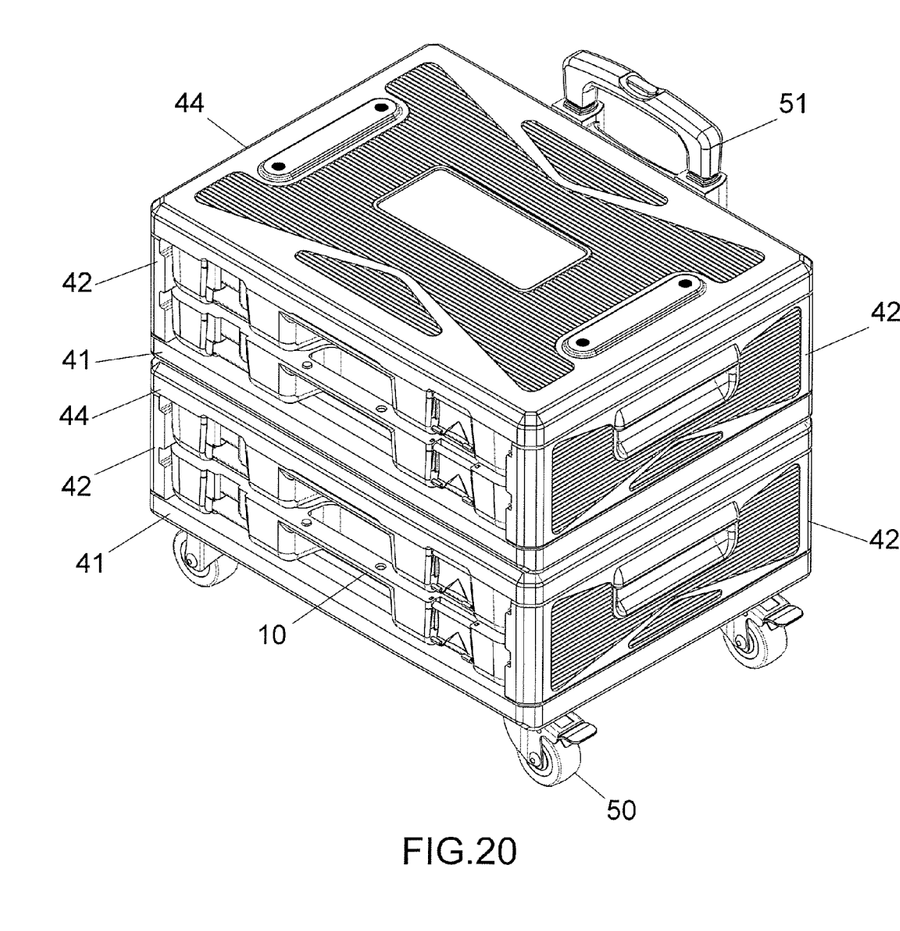
FIG. 20 is a perspective view of the second embodiment of the tool box of the present invention.

As shown in FIG. 20, two second bodies 40 are overlapped with each other, and the bolts 45 extend through the aligned second connection holes 443 and the first connection holes 413 to connect the two second bodies 40. The first rail 15 are engaged with the two second rails 424, and the first engaging portions 16 are engaged with the second engaging portions 425. The two first bodies 10 are overlapped to each other and located within the space 46 between the two second bodies 40. The wheels 50 are connected to the bottom board 41 of the lower second body 40, and the pull rod 51 is connected to the central portion of the two rear boards 43 so as to move the two second bodies 40 on the wheels 50 by operating the pull rod 51.

The connectors 20 are made by plastic injection molding so that the second and third pivotal portions 21, 22 have a certain level of flexibility so that the two first bodies 10 are easily connected to each other.

When the two first bodies 10 are opened, the user can apply a force to move the third pivotal portions 22 through the elongate openings 211 to separate the two first bodies 10.

The two first bodies 10 are easily connected to each other by the connectors.

The two second bodies 40 are connected to each other by the connection members 30 and the first snapping portions 14.

As shown in FIGS. 16 to 20, the tool box of the present invention can be combined with a wheeled cart.

While we have shown and described the embodiment in accordance with the present invention, it should be clear to those skilled in the art that further embodiments may be made without departing from the scope of the present invention.

What is claimed is:

1. A tool box comprising:

at least two first bodies and each first body having a front end and a rear end, each first body having at least two first mounting portions formed on the front end thereof, each first body having a first room and a first snapping portion formed on the rear end thereof, the first room having a first pivotal portion formed therein;

at least two connectors connected to the at least two first mounting portions, each connector having a second pivotal portion and a third pivotal portion on a front side thereof, the second pivotal portion being a tubular portion with a C-shaped cross section and having an elongate opening defined axially therethrough, a width of the elongate opening being smaller than an inner diameter of the second pivotal portion, the third pivotal portion being a rod with two side legs, the third pivotal portion having a medial section which shares a common axis with the second pivotal portion, a diameter of the medial section being equal to or smaller than the inner diameter of the second pivotal portion, each connector having a second mounting portion formed on a rear side thereof, the second mounting portion having a top jaw and a bottom jaw, a distance between the top and bottom jaws, the top and bottom jaws respectively engaged with a top and a bottom of the first mounting portion corresponding thereto;

the third pivotal portions of the connectors of one of the at least two first bodies extending through the elongate openings of the connectors of the other one of the at least two first bodies and being pivotably connected to the second pivotal portions so as to connect the at least two first bodies by the at least two connectors;

a connection member located within the first room and pivotably connected to the first pivotal portion, the connection member having a fourth pivotal portion and a second snapping portion respectively formed on a top and a bottom thereof, the fourth pivotal portion pivotably connected to the first pivotal portion, the second snapping portion of the connection member of one of the at least two first bodies connected to the first snapping portion of the other one of the at least two bodies, and a second body having a rectangular bottom board, two side boards, a rear board, a cover, multiple bolts and a space, the bottom board located at a bottom of the second body and having multiple first connection portions formed on two inner sides thereof, multiple second connection portions defined in an inner rear side of the bottom board and located between the first connection portions on the two inner sides of the bottom board, two first connection holes being defined through the bottom board and located close to each of the two inner sides of the bottom board, the first connection holes being circular holes, the two side boards located on two sides of the second body, the two side boards connected to the first connection portions, each side board having multiple third connection portions formed on an outer side thereof, the third connection portions connected to the first connection portions, each side board having multiple fourth connection portions on a top end thereof, each side board having multiple fifth connection portions formed on an inner side thereof, the rear board connected to a rear side of the second body and connected to the second connection portions, the rear board having multiple sixth connection portions formed on a bottom end thereof, the sixth connection portions connected to the second connection portions, the rear board having two seventh connection portions on each of two ends thereof, the seventh connection portions connected to the fifth connection portions, the rear board having multiple eighth connection portions formed on a top end thereof, the cover connected to the two side boards and the rear board, the cover having multiple ninth connection portions formed on two inner sides thereof, the ninth connection portions connected to the fourth connection portions of the two side boards, the cover having multiple tenth connection portions formed on an inner rear side thereof, the tenth connection portions connected to the eighth connection portions, two second connection holes defined through the cover and located close to each of two ends of the cover, the bolts extending through the aligned second connection holes and the first connection holes to connect the second body to an additional second body, the space defined between the bottom board, the two side boards, the rear board, and the cover, the space receiving the at least two first bodies.

2. The tool box as claimed in claim 1, wherein the at least two connectors each have a through hole defined therethrough which extends parallel to the mediate section.

3. The tool box as claimed in claim 1, wherein the first pivotal portion includes two circular holes, and the fourth pivotal portion is a tubular portion, a first pin extends through the fourth pivotal portion and is connected between the two circular holes of the first pivotal portion.

4. The tool box as claimed in claim 1, wherein the first, second and fifth connection portions are recesses, the third, fourth sixth, seventh and eighth connection portions are elongate blocks.

5. The tool box as claimed in claim 4, wherein the third connection portions each have a protrusion, the third connection portions are force-fitted into the first connection portions.

6. The tool box as claimed in claim 1, wherein the at least two first bodies each have a first rail on each of two sides thereof, each first rail has a first engaging portion which is located close to the first mounting portion, the side boards each have two second rails which are located between the third and fourth connection portions, the second rails are slidably engaged with the first rail, each second rail has a second engaging portion on an end thereof, the second engaging portion is engaged within the first engaging portion, the second engaging portion is an oval protrusion.

7. The tool box as claimed in claim 1, wherein the bottom board has four wheels connected to four corners thereof so that the second body is moved with the wheels.

8. The tool box as claimed in claim 1, wherein the rear board has a pull rod connected thereto, the pull rod is retractable.

9. The tool box as claimed in claim 1, wherein the at least two first bodies are made by way of plastic injection molding or plastic injection blow molding, or made by metal.

* * * * *